United States Patent
Lan et al.

(10) Patent No.: US 6,927,837 B2
(45) Date of Patent: Aug. 9, 2005

(54) METHOD FOR TRANSFERRING A DIGITAL IMAGE SO AS TO VISUALLY RESTORE SAID DIGITAL IMAGE, AND DEVICE FOR CARRYING OUT SAID METHOD

(75) Inventors: Ke-Hua Lan, Grenoble (FR); Patrice Lavergne, Monteynard (FR)

(73) Assignee: KIS, Echirolles (FR)

( * ) Notice: Subject to any disclaimer, the term of this patent is extended or adjusted under 35 U.S.C. 154(b) by 0 days.

(21) Appl. No.: 10/877,617

(22) Filed: Jun. 25, 2004

(65) Prior Publication Data

US 2004/0233406 A1 Nov. 25, 2004

Related U.S. Application Data

(63) Continuation of application No. PCT/FR03/00290, filed on Jan. 31, 2003.

(30) Foreign Application Priority Data

Feb. 19, 2002 (FR) .............................................. 02 02082

(51) Int. Cl.$^7$ ........................ G03B 27/42; G03B 27/52; G02F 1/1335
(52) U.S. Cl. .............................. 355/53; 355/55; 349/57
(58) Field of Search ...................... 355/53, 55; 353/31; 359/40; 349/117, 95, 5, 57

(56) References Cited

U.S. PATENT DOCUMENTS

| 4,956,663 A | | 9/1990 | Gerstch ........................ 355/38 |
| 5,684,548 A | * | 11/1997 | Ariki et al. .................... 349/57 |
| 2002/0131022 A1 | * | 9/2002 | Shibatani et al. .............. 353/31 |

FOREIGN PATENT DOCUMENTS

| EP | 0 615 150 | 9/1994 | ......... G02F/1/1335 |
| EP | 0 987 875 | 3/2000 | .......... H04N/1/195 |

* cited by examiner

*Primary Examiner*—Peter B. Kim
(74) *Attorney, Agent, or Firm*—Heslin Rothenberg Farley & Mesiti P.C.

(57) ABSTRACT

A method for visually restoring a digital image that is displayed on a transparent LCD screen includes associating an array of microlenses with the LCD screen at the input face thereof, upstream from a black mask. Each of cells of the LCD is associated with a microlens of the array. A telecentric projection lens increases the sharpness and uniformity of the image during the visual restoration thereof. The angle of divergence of an incident beam of exposure or illuminating light is verified. The LCD screen or each pixel of the image displayed on the LCD screen is laterally offset at least once on the projection surface by means of a body. One or several exposures are taken of each of said offset projections.

9 Claims, 5 Drawing Sheets

METHOD FOR TRANSFERRING A DIGITAL IMAGE SO AS TO VISUALLY RESTORE SAID DIGITAL IMAGE, AND DEVICE FOR CARRYING OUT SAID METHOD

CROSS REFERENCE TO RELATED APPLICATIONS

This application is a continuation of International Application PCT/FR03/00290 filed on Jan. 31, 2003. and published in French as International Publication WO 03/071778 A1 on Aug. 28, 2003. and claims priority of French patent application number 02.02082 filed on Feb. 19, 2002, the entire contents of these applications being incorporated herein by reference.

The invention relates to an optimized method for transferring digital images so as to visually restore the images using a transparent liquid crystal screen. It also relates to the device for implementing such a method.

In the framework of the development of novel technologies for the projection of information displays that use digital signals, the use of panels and other liquid crystal screens, commonly referred to as LCD (Liquid Crystal Display) screens, has contributed to the simplification both of the transfer processes and of the devices for implementing them.

Such LCD screens have, in fact, turned out to be very relevant to the development of the API (Advanced Photographic Image) concept using the digital image storage principle. This digital storage of the image requires a method of recovery thereof in order to reproduce a hard copy, notably on paper. The type of paper used depends on whether a digital or photographic printing technique is implemented.

The commonly stated advantages of using such LCD screens are the following:
 they are geometrically stable;
 the component does not require high voltages;
 and, furthermore, its completely automated manufacturing process ensures a very good repeatability in terms of performance.

However, their use in the field of photography, and more particularly as regards printing onto photosensitive paper, poses two types of problems:
 the first problem resides in the fact that the image pixel on an LCD, which traditionally has a square shape, comprises an active pixel surface area in the form of a rectangle which only covers about 50 to 75% of the total surface area of said pixel. In fact, there is therefore a non-active region of the image pixel which appears in the form of two strips, respectively one relatively wide strip on one side of the pixels, and a somewhat narrower strip on the perpendicular immediately adjacent side, which, when projected onto photosensitive paper by a projection lens, generates horizontal and vertical white marks on the final photograph, thus limiting the sharpness, the resolution and, consequently, the quality of the photograph;
 the other problem resides in the fact that current LCDs have a resolution that is limited to approximately 1024×1280 pixels, or even to 1200×1600 pixels. This limited resolution, inherent in the manufacturing technology, is not sufficient for photographs of higher format than 10×15 cm, since such a resolution is already limited to about 210 dpi, or even to 266 dpi for LCDs with 1200×1600 pixels, in other words about four to five pairs of rows/mm (4 pl/mm–5 pl/mm) which is the acceptable limit for a digital photograph.

In order to overcome these various drawbacks, a method has been proposed, for example in the document EP-A-0 987 875 by the Applicant, that aims in particular to perform, using a single optical mechanism, at least one lateral shift in the projection plane of each of the pixels of the image displayed on the LCD, and to effect one or more exposures on said visual restoration medium for each of these shifts.

In this way, the exposure of these small lateral shifts, of about half a pixel, of the images displayed on the LCD in the exposure plane allows the virtual elimination of the horizontal and vertical white marks generated by the LCD and inherent in its technology of manufacture.

On the other hand, this method leads to a slight overexposure producing gray marks which, although they are of low contrast or are very small such that they are not visible to the naked eye for small format photographs, will nevertheless be apparent on photographs of larger dimensions.

For this purpose, the proposed device uses a single thin plate of uniform thickness with parallel faces that is transparent to the spectrum of the exposure light and is situated in the optical path of the light source between the LCD screen and the projection lens.

This thin plate with parallel faces is also capable of a discrete or continuous rotational movement about an axis that is parallel or not to the optical axis. In addition, this thin plate with parallel faces is inclined with a given angle with respect to the plane perpendicular to its axis of rotation.

This thin plate with parallel faces allows the lateral shifts of the image displayed on the LCD to be effected such that the shifts are obtained with a much higher precision than the mechanical shifts that can be obtained with the devices of the prior art.

Without doubt, although the implementation of such a device leads to an optimization in the quality of the image restoration, gray marks, inherent in the rectangular shape of the LCD pixel and in the fact that the active surface area of said LCD pixel is too large, are still observed and are visible on larger format photographs. Moreover, the resolution is inadequate for large format photographs.

The aim of the present invention is to overcome these drawbacks by controlling both the shape and the size of the LCD pixel, as well as by adding image pixels, in order to enhance the resolution of larger format photographs.

For this purpose, an object of the invention is a method for visually restoring a digital image, displayed on a transparent LCD screen, which consists in:
 associating with the LCD screen an array of microlenses at its input face, upstream of a black mask defining apertures positioned facing each of the screen cells, each of the cells constituting the LCD being associated with one microlens;
 using telecentric projection optics designed to increase the contrast and the uniformity of the image in the visual restoration;
 controlling the divergence angle of the incident beam of said exposure or illuminating light, so as to allow, in association with the microlens array and the mask, the control of the size and the shape of the spot emerging from each of the LCD cells and, in association with the telecentric projection optics, the control of the effective size and shape of the pixels in the visual restoration;
 performing, by means of a mechanism, at least one lateral shift in the projection plane of the LCD screen or of each of the pixels of the image displayed on the LCD;
 and carrying out one or more exposures on said visual restoration medium for each of these shifts.

In other words, the invention firstly consists in implementing an LCD screen with very wide aperture, in practice denominated UHA LCD (Ultra-High Aperture LCD), the integration of a microlens array into which allows the light to be concentrated into the central part of each cell of the LCD, thus artificially increasing the aperture of-the screen.

In this way, the resulting brightness of the LCD screen is increased despite a moderate power of the lamp, and in addition the contour of the cells is practically invisible.

It also consists in controlling the divergence angle of the incident beam, so as to thus allow the shape and the size of the spot of the LCD screen cells to be further controlled, such that the resulting image has a continuous appearance, an effect which could not be achieved until now with an LCD screen.

In addition, telecentric projection optics allow the contrast and uniformity of the images to be increased on the photograph.

Another object of the invention is the device for visually restoring one or more digital images displayed on a transparent LCD screen.

This device comprises:

a light source, in whose optical path is positioned said LCD screen, on which are displayed digital images, notably by means of a central processing unit;

a shutter for blocking the light beam on demand;

a disk carrying red, green and blue filters, in order to allow the generation of color photographs, using the principle of additive synthesis;

a telecentric projection lens, situated between the LCD screen and the exposed paper;

two linear polarizers situated in the optical path of the exposure light, on either side of the LCD screen;

a mechanism designed to allow a lateral shift of the LCD screen or of each of the pixels of the image displayed on the LCD to be performed, in order to allow two or more exposures of the image displayed-on the LCD;

an optical mechanism, situated upstream of the LCD screen, designed to allow the diffusion of the light beam and its adaptation, in correlation with the microlens array, to the size and shape of each of the cells constituting the LCD screen.

The manner in which the invention may be implemented and its resulting advantages will become clearer from the following exemplary embodiments that are presented by way of indication and as as non-limiting examples, supported by the appended figures.

FIG. 5a is a schematic view of a first embodiment of the invention, of which

The description that follows is more particularly oriented toward a device integrated within an installation for carrying out the reproduction of photographic prints.

It should however be understood that the invention would be in no way limited to this single application.

Figure 1:
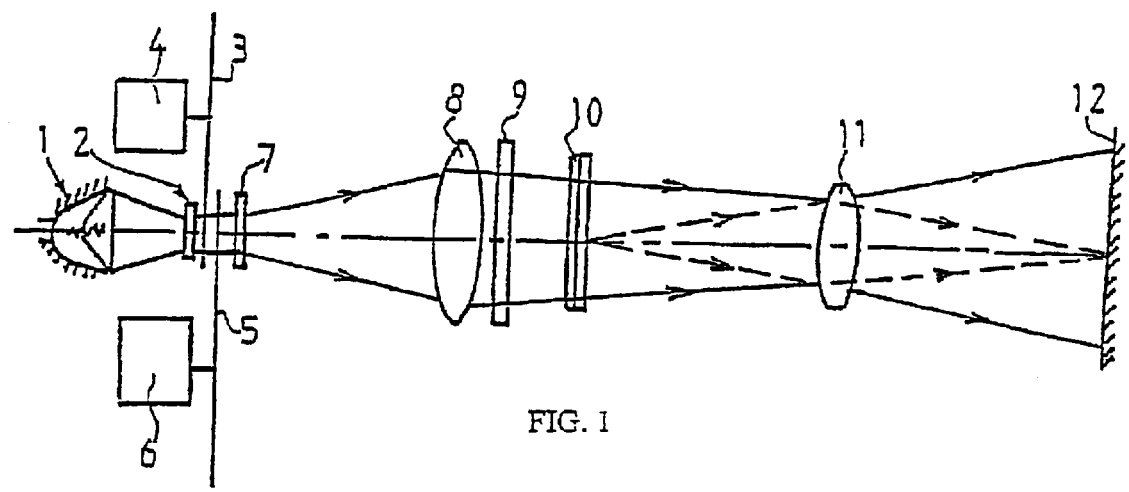
FIG. 1 is a schematic view of the exposure line of a traditional photographic printer.

In FIG. 1 is shown the exposure line of a traditional photographic printer.

Conventionally, within this device are found the following different elements:

a light source (1), typically consisting of a 250 W/24 V halogen lamp;

a heat filter (2);

a shutter turret (3), rotatable by means of an electric motor (4), designed for blocking the incident beam emitted by the light source (1), and also providing the function of diaphragm if required;

a filter holder (5), also rotatable by means of an electric motor (6), and holding three filters, respectively red, green and blue, for the purpose of producing color photographs by additive synthesis;

a diffuser (7) designed to broaden and enhance the uniformity of the incident beam emanating from the light source (1);

a condenser (8) designed to steer the incident beam, after diffusion, toward a projection lens (11);

a compensator or corrector (9) for the illumination uniformity, typically formed by an opaline;

a film holder (10), into which the film is introduced and framed to allow the exposure of successive shots;

the projection lens (11) previously mentioned; this exhibits a variable magnification factor depending on the format of photographs to be printed; its purpose is to project the image of the film present in the film holder onto the photosensitive paper (12);

and finally, a tray designed to receive the photosensitive paper (12) onto which the image present in the film holder is to be printed.

Within the framework of the invention, the film holder (10) is replaced by an LCD screen (15), for example formed by a panel marketed by EPSON under the reference number L3P13Y-25G01, comprising a matrix of 1366×1024 active pixels, and on which can be reproduced an image stored in digital form. This LCD screen (15) is preceded by a linear polarizer (16) required for the operation of said LCD screen. The purpose of this polarizer is to polarize, according to a given orientation, the light coming from the incident beam.

This LCD screen is equipped, on the one hand, with a mask (20), defining apertures positioned facing each of the cells of the screen. This aperture corresponds, in general, to the maximum size of pixel spot that can be obtained (=57% of the total surface area of the geometric pixel).

Furthermore, the LCD screen (15) also comprises an array of microlenses (21), also situated at the upstream face of the screen, said microlens array (21) itself being situated upstream of the mask (20) with respect to the direction of propagation of the light, each of the cells constituting the LCD screen being associated with one of these microlenses.

Figure 4A:
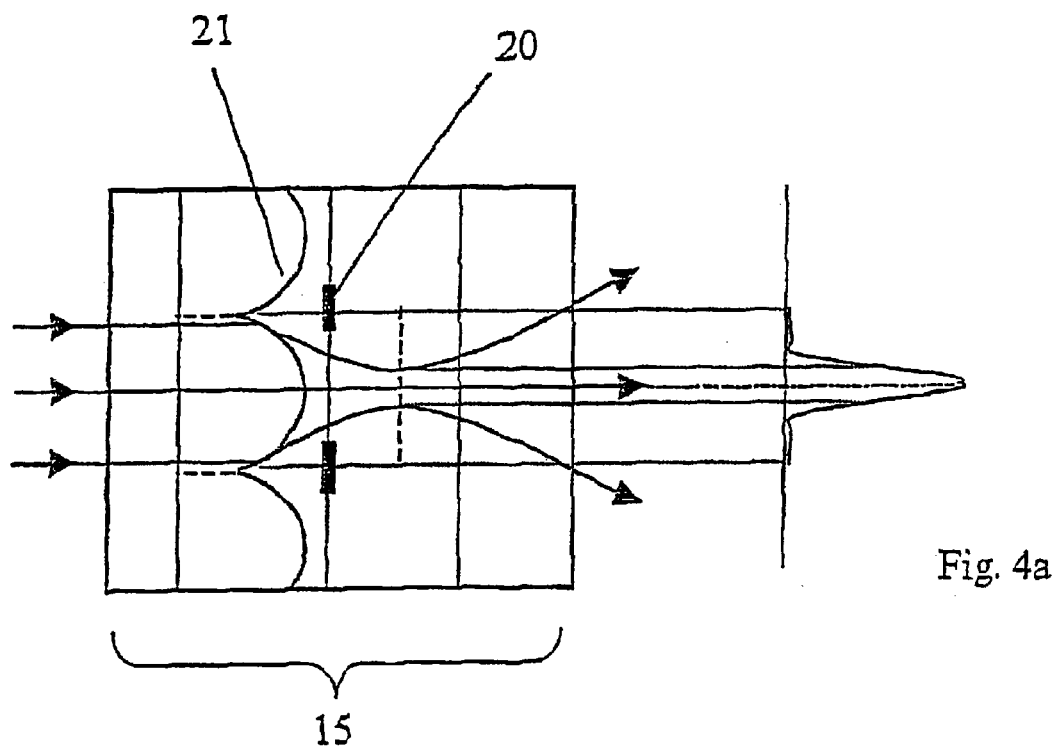
FIG. 4a is a schematic view of the structure of a UHA LCD, such as that marketed by Epson, and showing the emergent energy distribution for a light beam of parallel incidence.

The purpose of these microlenses is initially to collect the light covering the whole of the geometric surface area of the pixel, rather than just the active surface area of the pixel, such as is known for traditional LCD screens. A greater amount of light is therefore collected (FIG. 4a). These microlenses focus the light to the center of the cell of each of the LCD pixels, the energy distribution of the luminous spot emerging from said pixel being approximately a Bessel function of circular size 4 or 5 times smaller than that of the pixel for a parallel incident light beam (FIG. 4a). This introduces wide and very visible white marks into the resulting photograph.

For a very divergent incident light beam, the pixel black mask chops out a part of the image beam. The energy distribution of the pixel luminous spot is approximately a Sinc function of virtually rectangular shape limited by the black mask. It should be recalled that the role of the black mask is to hide the electrodes of the control electronics for each pixel.

Figure 2:
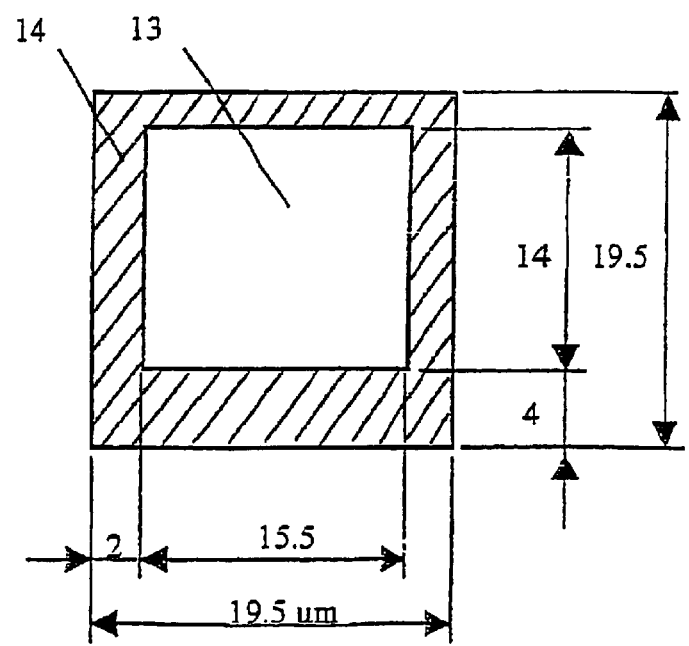
FIG. 2 is a schematic view of a pixel of an LCD marketed by Epson.

A schematic view of an Epson L3913Y-25G01 LCD pixel is shown in FIG. 2, comprising an active region (13) and an inactive region with reference (14). Since the black mask aperture has a surface area of 57% of the total geometric pixel surface area, the photograph resulting from a process of laterally shifting exposures, such as that described in the document EP-A-0 987 875, still exhibits the visible gray marks previously seen.

As with all LCD screens, the image contrast depends on the viewing angle. Using conventional projection optics produces a non-uniform photograph-of variable-contrast.

The invention consists not only in overcoming these flaws, but also in significantly improving the quality of the photograph as regards both the continuity and the resolution of the image.

In order to avoid the consequences of the visible white or gray marks, the capability of modulating both the size and the shape of the pixel spot should be provided. For the uniformity and contrast of the photographic image, telecentric projection optics should be used. Lastly, in order to optimize the resolution, image dots are added to the photograph either by means of a lateral shift of the LCD screen, or by a lateral shift of the pixels displayed on the LCD.

Figure 3B:
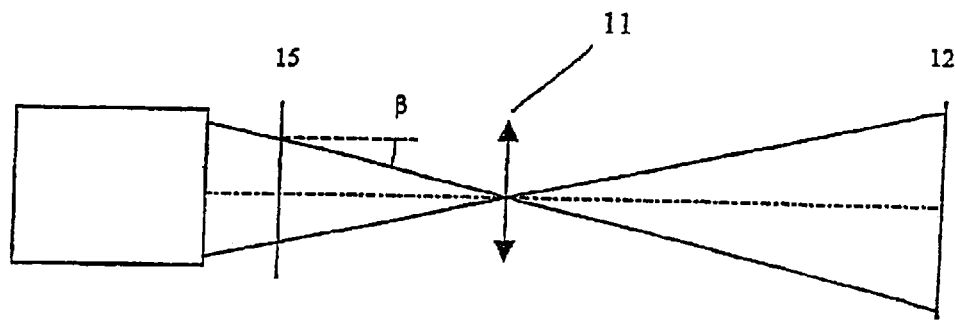
FIG. 3b is a schematic view of a conventional optical projection system.
Figure 3A:
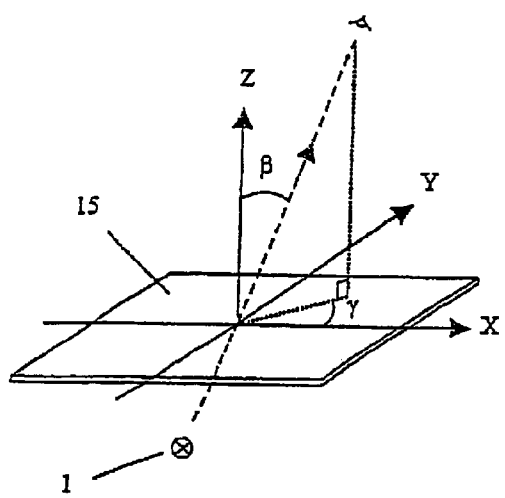
FIG. 3a is a schematic view illustrating the direction of visualization of the image on the LCD.

The image displayed on the LCD screen exhibits a variation in contrast that depends on the viewing angles $\beta$ and $\gamma$ (FIG. 3a). For $\beta=0°$, in other words at the viewing direction perpendicular to the LCD screen or parallel to the projection optical axis Z, the image displayed often has a contrast peak depending on the LCD used. For $\beta \neq 0$, the contrast is weaker and non-uniform for the $\gamma$ angles.

Figure 3C:
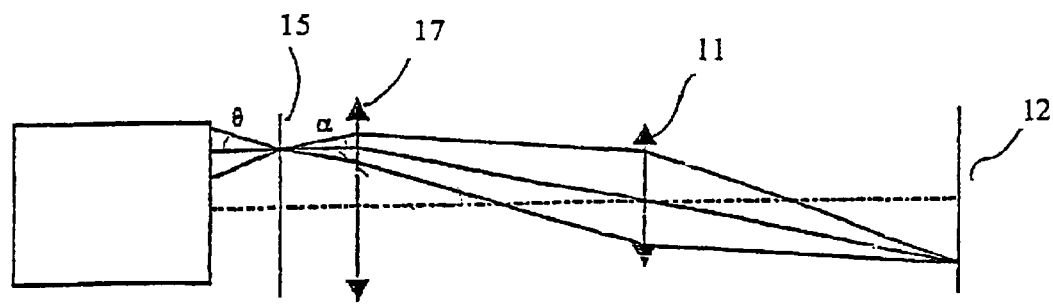
FIG. 3c is a schematic view of a telecentric optical projection system for LCD.

It is for these reasons that, when using conventional projection optics which give angles that vary depending on the positions of the pixels on the LCD (FIG. 3b), the image projected onto the paper is non-uniform and of variable contrast. In order to avoid, or at the very least to reduce this intrinsic effect inherent to LCD technology, a telecentric optical projection system must be used. Such a telecentric optical system typically consists of (see FIG. 3c) two convergent optics, one of which is formed by the main projection lens (11) of the optical system, and the other of which is formed by a field lens (17) of focal length $F_0$. The main lens (11) must be placed in the focal plane of the field lens (17). With this arrangement, all the main rays that pass through the diaphragm of the main lens (11) are collimated by the field lens (17) in the object space, that is to say between the LCD screen and the field lens (FIG. 3c). This optical assembly therefore provides a normal incidence of the main ray for each of the LCD pixels. It therefore becomes possible to correct the variation in contrast and the non-uniformity of the image.

Figure 4B:
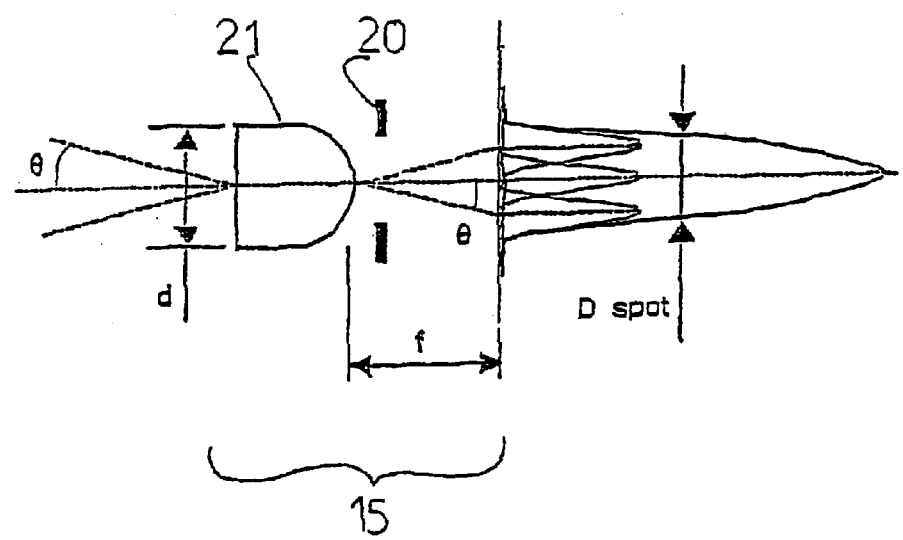
FIG. 4b is a schematic view of the spot formation by the microlens of a UHA LCD of the type of that described in relation to FIG. 4a, for a beam of divergent incidence, and showing the size of the resulting spot.

FIG. 4b shows the formation of the pixel spot image on the LCD screen with the microlens. If the microlens (21) is assumed to be perfect, in other words without aberrations, and if f and d are the focal length and the diameter of the microlens, respectively, the diameter of the Airy disk of the spot is obtained as:

$$D_{Airy}=2.44\lambda f/d \quad (1)$$

The diameter of the Airy disk at 50% of the peak energy is approximately:

$$\phi \approx 0.5 \, D_{Airy}=1.22\lambda f/d \quad (2)$$

The diameter of the spot for an incident beam of circular divergence $\theta$ is approximately:

$$D_{spot} \approx \phi+2f \tan \theta=1.22\lambda f/d+2f \tan \theta \quad (3)$$

For an incident beam originating from a divergence in one direction (X for example) or different divergences in two or more directions (X and Y for example), the shape of the pixel spot is no longer round. Using this method, the shape of the pixel spot can be controlled.

Thus, taking for example the case of an EPSON L3P13Y-25G01 LCD, f≅107 µm, d≅19.5 µm, for λ=0.55 µm and according to the formula (3), a spot of diameter $D_{spot} \approx 5$ µm for $\theta \approx 0.5°$, $D_{spot} \approx 11$ µm for $\theta \approx 2°$, and a spot of rounded rectangular shape with dimensions 5×11 µm for $\theta_x \approx 0.5°$ and $\theta_y \approx 12°$ are obtained. For a larger divergence angle, $\theta \approx 5°$ for example, $D_{spot} \approx 22$ µm. This latter value is not possible since the black mask cuts out or masks the image beam. The spot will be smaller and will take the shape of the black mask aperture.

In reality, the effective size of the spot, in other words the size of the spot that is useful for the image formation on the paper, is limited by the projection lens. The lens aperture defines the collection angle $\alpha$ of the cone of the light beam that can pass through this lens. If $f_{num}$ represents the f-number of the projection lens aperture and M the magnification, the collection angle a of the cone of the useful beam is obtained according to the following expression:

$$\alpha=\arctan(1/(2(1+1/M)f_{num})) \quad (4)$$

FIG. 3c shows, on the one hand, the divergence angle $\theta$ of the illuminating or incident beam, and the collection angle $\alpha$ of the projection beam used. The projection lens limits the incident beam of useful divergence to $\theta=\alpha$. As the size of the spot on the LCD is linked to the divergence $\theta$ of the incident beam on the LCD screen (cf. formula (3)), the projection lens therefore limits the effective size of the pixel spot. Consequently, the effective size of the pixel spot is linked-to these two angles $\theta$ and $\alpha$ in combination with the microlens of the LCD screen and the vignetting effect of the black mask. The formula for determining the effective size of the pixel spot is thus obtained as:

$$D_{spot-eff} \approx \phi+2f \tan \theta=1.22\lambda f/d+2f \tan \theta \; (\theta=\alpha \text{ for } \theta>\alpha) \quad (5)$$

When $\alpha$ becomes large (and $\theta>\alpha$), in order that the effective spot size $D_{spot-eff}$ calculated according to the formula (5) approaches the size of the black mask aperture of the LCD screen, the vignetting effect of the mask becomes visible. The shape of the spot therefore becomes rectangular like the mask aperture.

In the example using a projection lens of aperture $f_{num}=8$ and of magnification M=10, the collection angle according to the formula (4) becomes $$\alpha \approx 3.3°$$

and the effective maximum size of the spot, according to the formula (5) and limiting $\theta$ to $\theta=\alpha$, $$D_{spot-eff} \approx 16 \, \mu m.$$

This size is greater than the size of the aperture of the LCD screen-black mask. The vignetting effect of the mask therefore limits the spot to a rectangular shape. This size is too large to use the-image addition method according to the teachings of the document EP-A-0 987 875. It is therefore necessary to control the angles $\theta$ and $\alpha$ in order to control the size and the shape of the spot. Since the aperture of the projection optics is often fixed for reasons of image resolution and of light collection, the angle $\alpha$ is therefore predefined. It is easier to control the divergence angle θ of the illuminating beam.

For this purpose, the invention proposes the insertion of an optical mechanism upstream of the LCD screen.

Figure 5A:
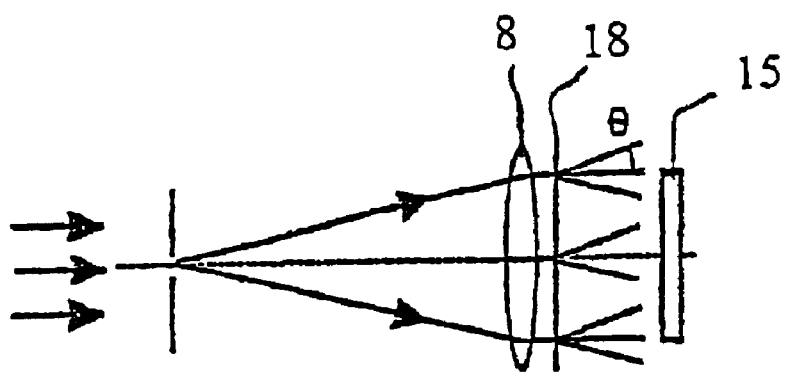

In a first embodiment, a specific diffuser (18) is inserted on the optical path between the collimating lens (8) and the LCD screen (15) (cf. FIG. 5a). The diffuser diffuses the incident light into a cone of its diffusion angle. The optical characteristics of the diffuser may therefore be adapted according to the application requirements.

Thus, if it is desired to produce a circular spot emerging from the LCD screen, a circular diffuser is employed. In other words, the diffusion produced is symmetric with respect to the axis of the incident light beam.

On the other hand, in order to obtain a square or rectangular spot shape, a diffuser is used with split diffusion in the X,Y direction, defining the plane in which each of the cells of the LCD screen are contained. This type of diffuser can be fabricated by holographic technology that is well known for this application.

This diffuser (18) may also be positioned just upstream of the collimating lens (8) (cf. FIG. 5b), the resulting optical effect being basically equivalent to that obtained with the configuration of FIG. 5a.

The use of such a diffuser turns out to be especially effective. However, a specific diffuser (18) with well-defined divergence angles is required.

Figure 6:
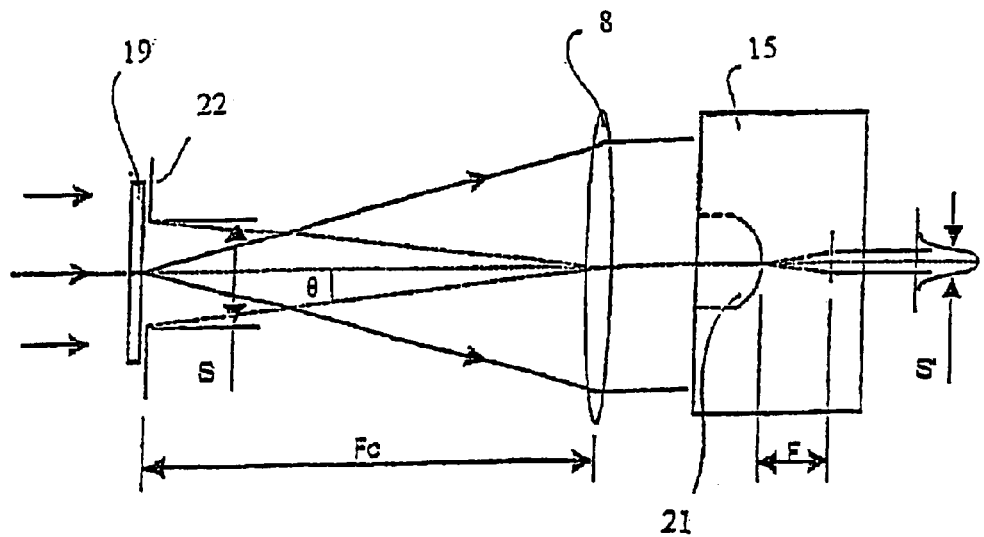
FIG. 6 is a schematic view of a second embodiment of the invention.

For reasons of production cost and ease of adjustment, the invention proposes a second embodiment shown in FIG. 6.

In this configuration, an illumination diaphragm (22) of adjustable size and shape is positioned right next to a diffuser (19), which diaphragm has the function of controlling the divergence θ of the illuminating beam and therefore the size and shape of the pixel spot. The diffuser (19) is placed in the focal plane of the collimating lens (8), and is situated in the illumination path of the light source (1) in order to provide a uniform illumination at the collimating lens (8).

In this case, the divergence angle of the illuminating beam coming from the collimating lens (8) is obtained by the expression:

$$\theta = \arctan(S/(2F_c)) \quad (6)$$

where S is the size ($D_x$, $D_y$ or D) of the aperture of the pupil (22), and $f_c$, the focal length of the collimating lens (8). By combining the formula (6) and (5), the effective size of the pixel spot can also be determined as follows:

$$D_{spot-eff} \cong \phi + 2f \tan\theta - 1.22 \lambda f/d + S f/f_c \quad (\theta = \alpha \text{ for } \theta > \alpha) \quad (7)$$

Furthermore, if the effect of optical diffraction is neglected, the size of the spot emerging from the cell of the LCD screen can be determined from the geometric imaging formula:

$$S' = S f/f_c \quad (8)$$

Where S' is the emerging size ($D_x$, $D_y$ or D) of the pixel spot and f the focal length of the microlens (21).

It can be seen that there is one less term ($\phi \cong 1.22 \lambda f/d$) in the formula (8) with respect to the formula (7): this corresponds to the optical diffraction term. Indeed, when the spot size is large relative to the diffraction in the case of geometric optics, the diffraction effect can be neglected. On the other hand, when the spot is comparable to the size of the diffraction, the optical diffraction effect is significant.

Since the microlens of the LCD screen has flaws in uniformity or optical aberrations and the LCD screen black mask and the projection lens aperture cut out the image formation light beam of the system, the effective size of the spot determined by the formula (5) or (7) is not really accurate enough. The techniques presented are intended to orient the means and direction of research. In practice, an evaluation should firstly be made, then the choice should be adjusted more precisely in order to compensate for the various possible imperfection factors of the optical components.

Figure 5B:
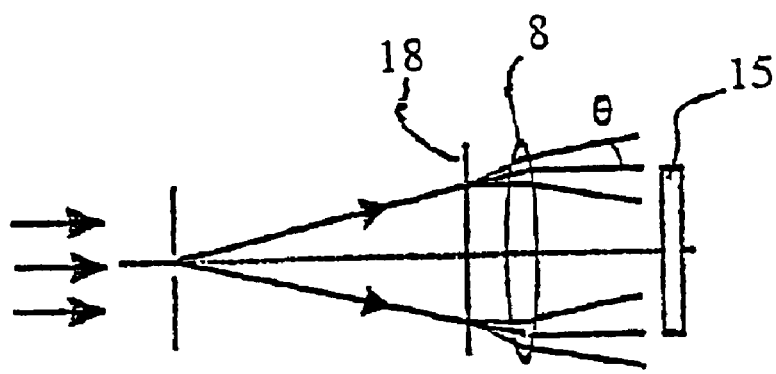
FIG. 5b is a variant.

As an example, for an Epson UHA LCD screen with reference L3P13Y-25G01 and for a telecentric lens with f/8 aperture and 10× magnification, corresponding to a collection angle $\alpha \cong 3.3°$, a holographic diffuser (18) with divergence angles $\theta_x \cong 6.5°$ and $\theta_y \cong 7°$ turns out to be suitable for producing a square spot with a side length 0.5 times the size of the geometric pixel (cf. FIGS. 5a and 5b). If only the illuminating pupil (22) is controlled, a diaphragm of about 9×10 mm and a focal length of 114 mm for the collimating lens (8) are suitable for the same conditions (cf. FIG. 7) It can now be observed that a spot of a given size and shape is arrived at, that can-perfectly easily be adjusted to match the size of the active surface area (13) of the LCD screen cell.

The two techniques described above for adjusting the shape and size of the pixel can be implemented independently or in an additive fashion, one with the other, in order to arrive at the desired pixel spot size and shape.

Figure 7:
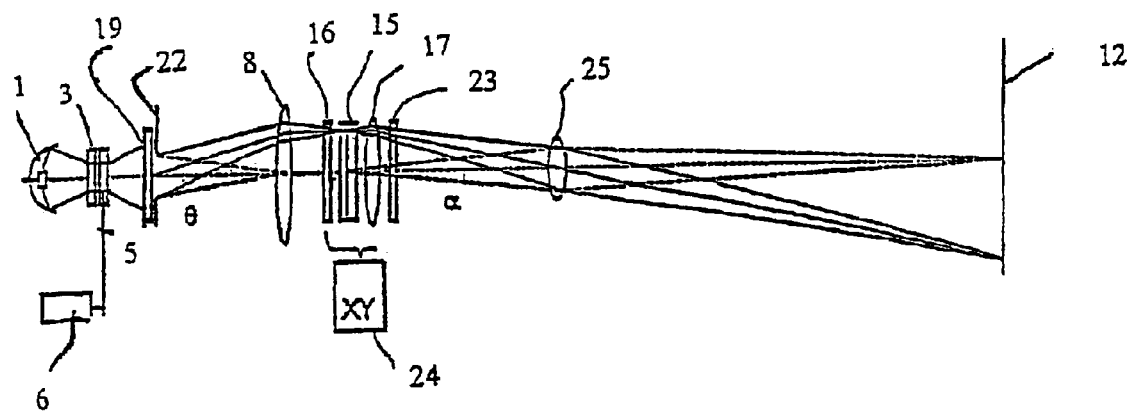
FIG. 7 is a view of the exposure line of a photographic printer implementing the device in FIG. 6.

FIG. 7 shows an optical system implementing the device of the present invention that is capable of being integrated, in particular, into a photographic printer. The light emitted by the light source (1) is directed toward a diffuser (19) after being filtered by a heat filter (3) and a set of filters (5) of red, green and blue color, in the same manner as was previously described.

The diffuser (19) diffuses the light uniformly over the collimating lens (8) through a field pupil (22), allowing the divergence angle θ of the incident beam, and as a consequence, the shape and size of the LCD pixel spot, to be controlled, as was previously described.

The LCD screen (15) is implemented for the display of the digital image to be exposed, and is equipped upstream with a linear input polarizer (16), and downstream with a linear output polarizer (23), assuming that said LCD is not internally fitted with such polarizers.

A field lens (17) is inserted in the optical path, between the LCD screen (15) and the polarizer (23), and in association with the main-projection lens (25) forms telecentric projection optics, required for the use of an LCD screen, in order to increase the contrast and uniformity of the image on the photograph.

A holder with piezo-electric micro-positioning in the X and Y directions (24), in other words in the plane of the LCD screen, is used to provide the lateral displacement of the LCD in a direction perpendicular to the optical axis of the optical assembly thus formed.

These lateral displacements of the LCD component are designed to allow the exposure of 4, 9 or even 16 sub-image projections resulting from the decomposition of a same image displayed on the LCD screen, following the same idea as that which has been described in the aforementioned European Patent 0 987 875 by the Applicant, and whose content is included by reference.

In short, the technique employed consists in resealing the original image into a whole number of pixels, typically 4 times more, 9 times more or even 16 times more than the number of pixels available on the LCD screen.

This resealing is carried out in the central processing unit that stores the digital images to be transferred to the photographic medium (12). Within this central processing unit, this image thus rescaled is divided into four, nine or sixteen frames, in the form of small squares.

Accordingly, in the configuration where four times the number of pixels than the number of pixels possible on the LCD screen are produced, for each image to be restored in four exposures, the four frames of the original image being displayed successively on the LCD screen, the method consists in, between each exposure, either displacing the LCD screen by means of the piezo-electric XY holder (24), or modifying the optical path, for example by means of a slightly inclined, thin plate with parallel faces placed in the optical path of the print line between the LCD screen and the projection lens (11), as previously described in the introduction.

Assuming a multiplication of the original image by four, the pixel spot must have a square shape with a surface area equal to one quarter of the total surface area of the geometric pixel.

The gray or white marks that were seen with the techniques of the prior art, within the exposed photograph, are no longer visible to the naked eye, or barely visible with a magnifying glass. Furthermore, an increase in the resolution is observed, since the latter typically reaches, with an image multiplication of four, a value close to 231 dpi for a 20×30 cm format photograph using the aforementioned Epson UHA LCD screen.

It is equally possible, still using the displacement of the piezo-electric holder (XY) (24), to perform 9 exposures of the same image rather than four exposures of said image, having pre-programmed the associated central processing unit accordingly with the new image dimensions.

The LCD pixel spot must then be a square with a surface area equal to $1/9^{th}$ of the total geometric pixel surface area.

Thus, for a screen such as the EPSON LCD of the type of that described previously, with such a device it is possible to arrive at a resolution close to 346 dpi for a 20×30 cm format photograph, which is a very clear improvement in the resolution, even for a photograph of relatively large format.

This resolution can be further increased by multiplying the number of exposures by 16 rather than 9. In this configuration, the image is subdivided into sixteen subimages. The pixel spot must have a surface area equal to $1/16^{th}$ of the total geometric pixel surface area for each of the cells of the LCD screen. As the pixel is small, the spot can have a circular shape which is easier to implement.

A resolution of about 462 dpi is achieved for a 20×30 cm format photograph. It is equally possible to produce larger sized photographs. Thus, if a maximum resolution of 300 dpi is maintained, the reproduction of 348×462 mm format photographs is feasible, which was not possible until now with LCD technology.

All the advantages of the device and method according to the invention have now been made clear, in the sense that, using an optical system that is relatively simple to implement, it allows the resolution and therefore the quality of the photographs to be optimized, while avoiding the drawbacks associated with LCD screens, namely the presence of white or gray marks, corresponding to inactive regions of the LCD pixels or to overexposed areas, the variable contrast and non-uniformity and the inadequate resolution for larger format photographs.

What is claimed is:

1. A method for visually restoring a digital image displayed on a transparent LCD screen, comprising:
    associating with the LCD screen an array of microlenses at an input face of the LCD screen, upstream of a black mask defining apertures positioned facing each of cells constituting the LCD, each of said cells being associated with a single pixel of said image and with one microlens of said array;
    using telecentric projection optics designed to increase contrast and uniformity of the image in the visual restoration;
    controlling the divergence angle θ of an incident beam of exposure or illuminating light, so as to allow, in association with the microlens array and the mask, control of size and shape of a spot emerging from each of the cells of the LCD screen and, in association with the telecentric projection optics, control of the effective size and shape of pixels in the visual restoration;
    performing, by means of a mechanism, at least one lateral shift in a projection plane of the LCD screen or of each of the pixels of the image displayed on said LCD screen;
    and carrying out one or more exposures on a visual restoration medium for each of these shifts.

2. The method for visually restoring a digital image displayed on a transparent LCD screen as claimed in claim 1, wherein:
    the digital image to be restored undergoes a rescaling within an associated central processing unit that stores said digital image;
    a thus rescaled image is divided into 4, 9 or 16 image frames displayable on the LCD screen;
    an exposure of each image frame displayed on the LCD screen is performed, while effecting, between two consecutive exposures, a discrete shift of all the image pixels displayed on the LCD screen in a plane comprising the LCD and symmetrically with respect to a center of each of the image pixels.

3. The method for visually restoring a digital image displayed on a transparent LCD screen as claimed in claim 2, wherein each of the frames undergoes three image planes, according to the three colors red, green and blue, resulting images then being obtained in color by an additive synthesis process.

4. A device for visually restoring one or more digital images displayed on a transparent LCD screen, comprising:
    a light source, in whose optical path is positioned said LCD screen, on which are displayed digital images, by means of a central processing unit;
    a shutter for blocking a light beam from said light source on demand;
    a projection lens, situated between the LCD screen and an exposed paper;
    two linear polarizers situated in the optical path of the light source, and positioned on either side of the LCD screen;
    a mechanism designed to allow a lateral shift of the LCD screen or of each of the pixels of an image displayed on said LCD screen to be performed, in order to allow two or more exposures of the image displayed on the LCD screen;
    wherein:
    the LCD screen is associated with an array of microlenses at an upstream face of the LCD screen, upstream of a mask defining apertures situated facing each of cells constituting the LCD screen, each of the cells constituting the LCD screen being associated with a single pixel of said image and with one microlens;
    the LCD screen is associated with telecentric projection optics designed to increase the contrast and uniformity of the images in the visual restoration; and
    further comprising an optical mechanism, situated upstream of the LCD screen, designed to allow diffusion of the light beam and its adaptation, in correlation with the microlens array and the mask, to size and shape of each of the cells constituting the LCD screen.

5. The device for visually restoring one or more digital images displayed on a transparent LCD screen as claimed in claim 4, wherein the optical mechanism designed to allow the diffusion of the light beam and its adaptation is formed by a diffuser, positioned around a collimating lens, situated in an optical path of the device.

6. The device for visually restoring one or more digital images displayed on a transparent LCD screen as claimed in claim 4, wherein the optical mechanism designed to allow the diffusion of the light beam and its adaptation is formed by the association of a diffuser, an illumination diaphragm of adjustable size and shape, the diffuser being placed in a focal plane of a collimating lens, situated in the optical path of the light source and upstream of the LCD screen.

7. The device for visually restoring one or more digital images displayed on a transparent LCD screen as claimed in any of claims 4 to 6, wherein the mechanism designed to achieve a lateral shift is capable of performing at least one lateral shift in a projection plane of each of the image pixels displayed on the LCD.

8. The device for visually restoring one or more digital images displayed on a transparent LCD screen as claimed in claim 7, wherein the mechanism providing the lateral shift in the projection plane of each of the pixels of the image displayed on the LCD screen is formed by a piezo-electric displacement holder providing a shift of the LCD screen itself.

9. The device for visually restoring one or more digital images displayed on a transparent LCD screen as claimed in claim 7, wherein the mechanism providing the lateral shift in the projection plane of each of the pixels of the image displayed on the LCD screen is formed by a thin plate of uniform thickness with parallel faces that is transparent to a spectrum of we exposure light used and is situated in the optical path of the device between the LCD screen and the projection lens, said thin plate being capable of a discrete or continuous rotational movement, whose axis of rotation is parallel or not to said optical path, said thin plate being inclined at a fixed angle with respect to a plane perpendicular to said axis of rotation.

* * * * *